Jan. 31, 1961

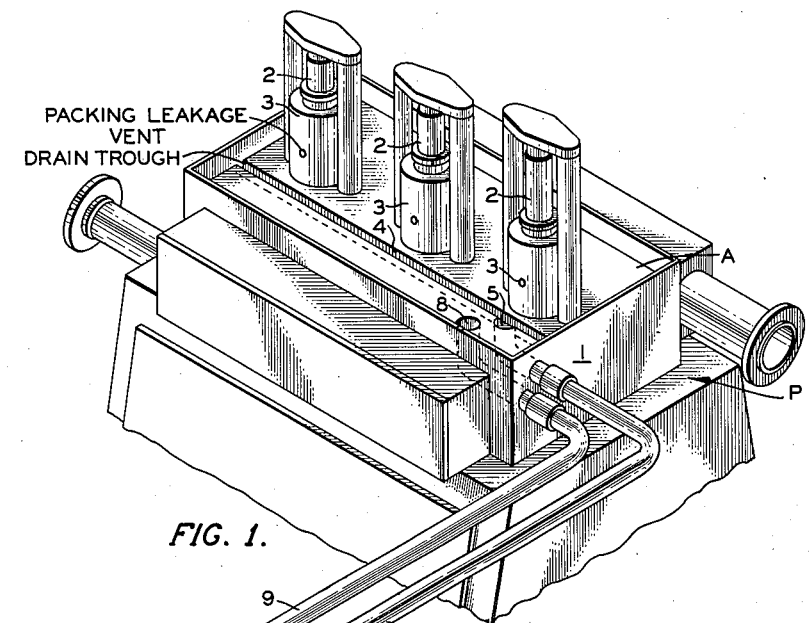
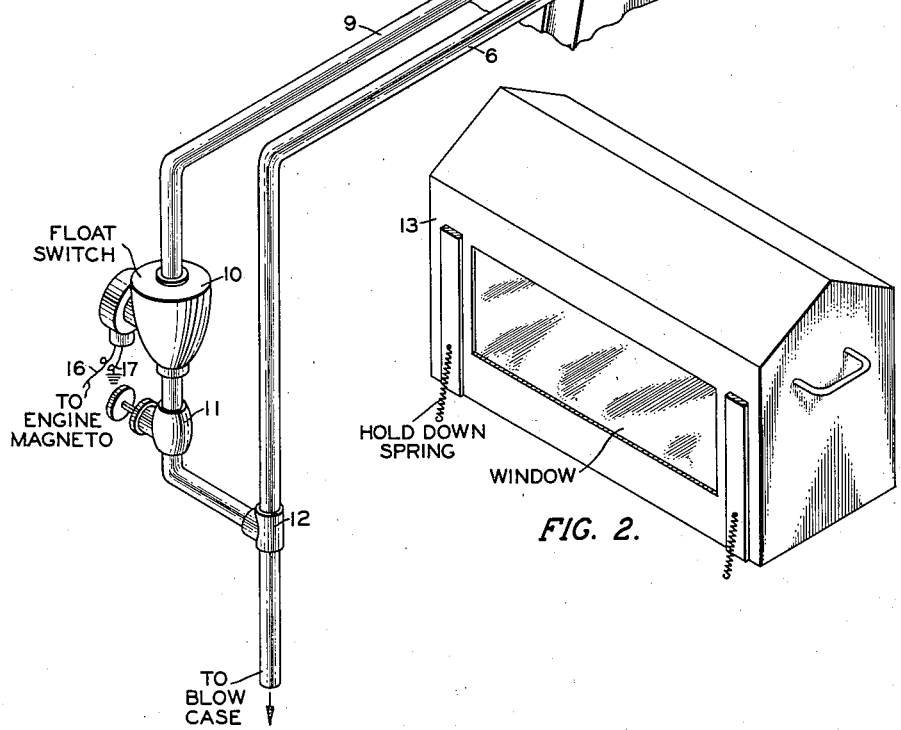

C. H. KANGAS 2,969,799

PUMPING SYSTEM

Filed Dec. 28, 1954

INVENTOR.
C. H. KANGAS

BY
Hudson & Young
ATTORNEYS

United States Patent Office 2,969,799
Patented Jan. 31, 1961

2,969,799
PUMPING SYSTEM

Charles H. Kangas, Bartlesville, Okla., assignor to Phillips Petroleum Company, a corporation of Delaware Filed Dec. 28, 1954, Ser. No. 478,082

9 Claims. (Cl. 137—2)

This invention relates to control of apparatus for pumping fluid and containing a seal against leakage of fluid. In one aspect this invention relates to structure comprising a positive displacement pump in which normal leakage around one of the rod driving means, or plungers, is entrapped, and in which any excess or undesirable leakage is measured, and in response to a measurement of a predetermined amount of same, flow of energy to the pump prime mover is cut off thereby terminating operation of the pump so that the undesirable leakage can be terminated. In another aspect this invention relates to a method for preventing excess packing leakage, in a positive displacement type pump, by terminating flow of energy to the pump prime mover in response to a predetermined measurement of the said excess leakage. In another aspect this invention relates to a shutdown device associated with a positive displacement pump in which undesirable packing leakage of fluid takes place, i.e., around the seal means associated with a rod driving member, which device is caused to operate responsive to a measured accumulation of the excessive leakage so as to terminate flow of energy to the pump prime mover. In another aspect this invention relates to apparatus including in combination a positive displacement pump of the type above described and associated means for terminating flow of energy to its prime mover in response to measurement of excess packing leakage, connected with a hydraulic pump to drive the same, such as in a bottom hole of an oil well, and associated conduits and vessels for effecting recovery of oil discharged from the said hydraulic pump.

Other aspects of this invention and its several related particulars are evident from a perusal of this disclosure, the drawings, and the appended claims.

It is known that there are often found in industries mechanisms for storing or conveying fluids which are subject to developing leaks or which for one reason or another are leaking, or leak from time to time. Leakages, as contemplated herein, often occur in connection with packing glands upon valves or pumps, etc.

In the operation of oil wells by means of hydraulic pumps, it is often desirable for the most efficient utilization of operating labor to leave the equipment unattended for periods of a few hours to a day or more. If serious plunger packing leakage occurs in the power oil pump during periods of unattended operation, it is desirable to provide means to stop the pump to prevent excessive loss of oil and possible fire. The present invention provides means to stop the pump prime mover when leakage through the pump packing becomes excessive.

According to this invention there are provided method and means for controlling leakage of fluid that occurs around the fluid seal of at least one plunger or rod drive means of a positive displacement type pump, which comprises collecting fluid that leaks around the said seal, measuring flow of said leakage, and in response to a measured predetermined amount of flow of undesirable or excess leakage, causing flow of energy to the pump prime mover to be cut off, thereby terminating operation of the pump and stopping the said excess flow so that the seal means can be altered and normal operation resumed.

Also in accordance with this invention apparatus, comprising a positive displacement type pump, prime mover means therefor, and wherein leakage of pumped fluid occurs around a fluid seal of said pump, is provided in combination with a receiving zone for the said leakage, a first conduit extending from a first level in the said receiving zone for conveying flow of fluid therefrom, a second conduit extending from a second level in the receiving zone, higher than the said first level, to convey fluid therefrom, liquid level responsive means in the second conduit, an energy source for the prime mover, means for operatively connecting the said liquid level responsive means with the said energy source to cut off flow of energy from the energy source to the prime mover, the said liquid level responsive means at a predetermined liquid level being adapted to control said energy source to cut off flow of energy to the pump prime mover to terminate operation of the pump.

Still according to this invention, apparatus is provided comprising a positive displacement type pump, driven by a prime mover, wherein leakage of pumped fluid occurs around a fluid seal of the pump, in combination with a receiving zone for the said leakage, a conduit extending from the receiving zone for conveying flow of liquid therefrom, an orifice in the said conduit adapted to permit flow of fluid from the receiving zone at a predetermined rate, liquid level measuring means in the said conduit intermediate said orifice and the receiving zone, an energy source for said prime mover, means for operatively connecting said liquid level responsive means with said energy source to cut off flow of energy from said source to said prime mover, said liquid level responsive means at a predetermined liquid level being adapted to control said energy source to cut off flow of energy to said pump and to thereby terminate operation thereof.

Still in accordance with this invention is provided apparatus comprising a positive displacement type pump, driven by a prime mover, wherein leakage of pumped fluid occurs around a fluid seal of said pump, and an energy source for the said prime mover, in combination with a receiving zone for said leakage, conduit means for conveying flow of fluid from the said receiving zone, liquid level measuring means operatively connected with said conduit means to measure liquid level therein, and also operatively connected with said energy source to cut off flow of energy from said source to said mover in response to a predetermined measured liquid level in said conduit means, thereby terminating operation of said pump when packing leakage becomes excessive.

Figure 1 is a perspective view of an embodiment of this invention in which is shown a positive displacement type pump with a plurality of conduit means for collecting packing leakage and for terminating flow of energy to the pump prime mover when the said leakage is excessive.

Figure 2 shows a pump cover that can be used in conjunction with the structure of Figure 1.

Figure 5:
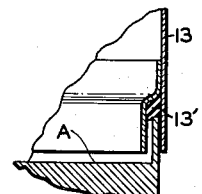
Figure 5 illustrates detail of one form of packing seal that can be employed to prevent leakage around the bottom of the pump cover illustrated in Figure 2.

With reference to Figure 1 reciprocating pump assembly P is comprised of working barrel or block 1 having a deck-type top side A through which plungers or drive rods 2 extend from the interior of assembly P, and packing glands 3. On deck A and disposed adjacent packing glands 3 is drain trough 4. Seal means 3' associated with each of packing glands 3 and rods 2 is maintained so as to substantially prevent flow of fluid, e.g. oil, from the interior of assembly P around drive rod 2 onto deck A. Trough 4 functions as a receiving zone for liquid lost by way of leakage from the interior of pump P around rods 2 so as to entrap the same to prevent its escape to external points. Drain connection 5 in trough 4 provides for withdrawal of a normal or contemplated amount of leakage (i.e., liquid leaked around the packing seal of one or more of drive rods 2). Flow of liquid by way of drain connection 5 is conducted via conduit 6 such as to blow case 7 of Figure 4. Drain connection 8 in deck A is disposed so as to withdraw liquid from deck A at a level higher than the level at which liquid is withdrawn via drain connection 5. Conduit 9 connected with drain connection 8 conducts flow of liquid by way of T 12 to blow case 7 together with fluid from conduit 6. Float chamber 10 in conduit 9 is any liquid level control-float switch mechanism of conventional design such as a Mercoid type 123 assembly. Valve 11 in conduit 9, intermediate float chamber 10 and T 12, is a valve of conventional design adjusted so as to provide an orifice of predetermined size in line 9. Pump assembly P is connected with any suitable prime mover not shown. Cover 13 (Figure 2) is adapted to fit on the top of block 1 (see Figure 5) so as to enclose drive rods or plungers 2 and associated mechanism and to prevent escape of oil leakage except that passed via connections 5 and 8, packing 13' serving to prevent leakage between cover 13 and block 1.

In the operation of this embodiment, as long as the amount of leakage past a plunger packing gland 3 is an amount considered normal, i.e. contemplated in accordance with conventional type operation of a positive displacement type pump, liquid is collected in drain trough 4 and is withdrawn via drain connection 5 and pipe 6 to blow case 7. Pipe 6 is adapted to convey not more than the said normal amount of leakage and therefore when leakage becomes excessive, i.e. the amount of liquid in trough 4 tends to overflow drain connection 5, the liquid is withdrawn from a higher level by way of drain connection 8, conduit 9 and float chamber 10. Generally, cover 13 maintained in place enables entrapment of liquid inside cover 13 so as to assure withdrawal of all excess leakage by way of connection 8 rather than by escape by running over block 1 and into surrounding areas of assembly P. Valve 11 is normally closed thereby permitting build-up of the level of the column of liquid in conduit 9 and within element 10. However, dependent upon the specific conditions desired, it is often advantageous to operate valve 11 as an orifice so as to permit a limited flow of liquid via conduit 9 and T 12. In any event, when an amount of leakage, greater than the normal contemplated amount is passed to blow case 7 (via T 12), excess flow of liquid (i.e. leakage), is entrapped in float chamber 10. Float chamber 10, therefore, provides for a measurement of the amount of excess or undesired leakage from trough 4 and at a predetermined level of liquid in element 10, as a result of accumulation of excess flow therein, float mechanism in element 10 actuates an electrical switch closing the same so as to complete a circuit from wire 16 to ground wire 17 such as by way of the engine magneto when an engine is used as the prime mover; in the latter case stopping the pump prime mover, and thus the positive displacement pump, and preventing further leakage of liquid through the pump packing. It is to be understood that regardless of the type of prime mover employed, closing of a switch in response to level in element 10 is adapted to terminate flow of energy to the prime mover thereby causing it to cease operation. In accordance with the foregoing embodiment, therefore, I have provided one means and method by which the pump prime mover is shut down to stop when packing leakage becomes excessive.

Figure 3:
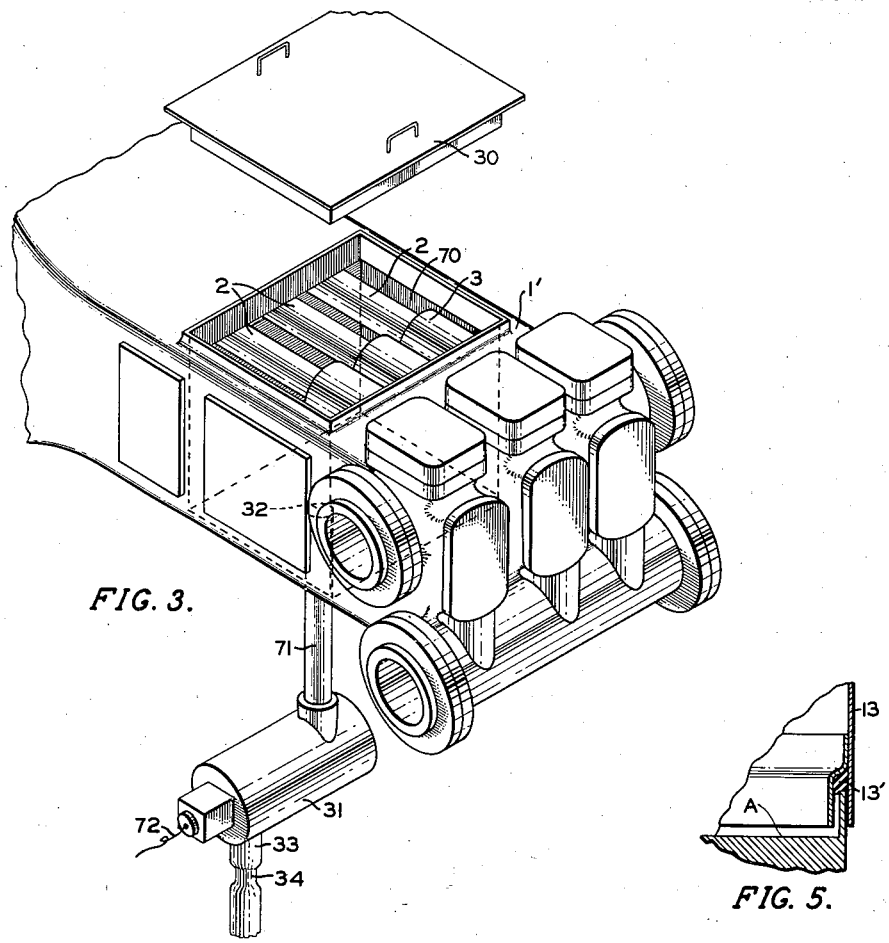
Figure 3 is a perspective view of an embodiment of this invention in which is shown a horizontal positive displacement type pump in combination with single conduit means and associated structure for collecting packing leakage and for terminating flow of energy to the prime mover when the leakage is excessive.

With reference to Figure 3 I have illustrated another embodiment of my invention as applied to operation of a horizontal positive displacement type pump wherein packing glands 3 and drive rods or plungers 2 are shown extending through block 1', horizontally disposed, and reservoir 70 together with cover 30 therefor, set in place, provides for collection of excess leakage around plungers 2 for withdrawal by way of drain connection 32. Cover 30 is tightly fitted into position with element 70 in carrying out this embodiment so as to prevent flow of any of the said leakage from element 70 except via connection 32. Conduit 71 is connected with drain connection 32 to convey liquid flow therefrom. Float switch 31 is disposed in conduit 71 and permits flow of liquid therethrough via outlet conduit 33 and suitably sized orifice 34. So long as the normal predetermined rate of leakage is encountered inside reservoir 70, flow of same is conducted via line 33. However, when excess leakage is encountered, the resulting excessive amount of liquid in element 31 is accumulated therein until the level of the same reaches a predetermined value whereby electrical circuit 72, which can be the same as that of Figure 1 or, if desired, any conventional control circuit, is actuated so as to cut off flow of energy to the prime mover thereby cutting off flow to the pump of Figure 3 when packing leakage becomes excessive. Preferably, wire 72 is operatively connection with the magneto of an engine as prime mover so as to thereby terminate operation of the same when the switch is closed.

Figure 4:
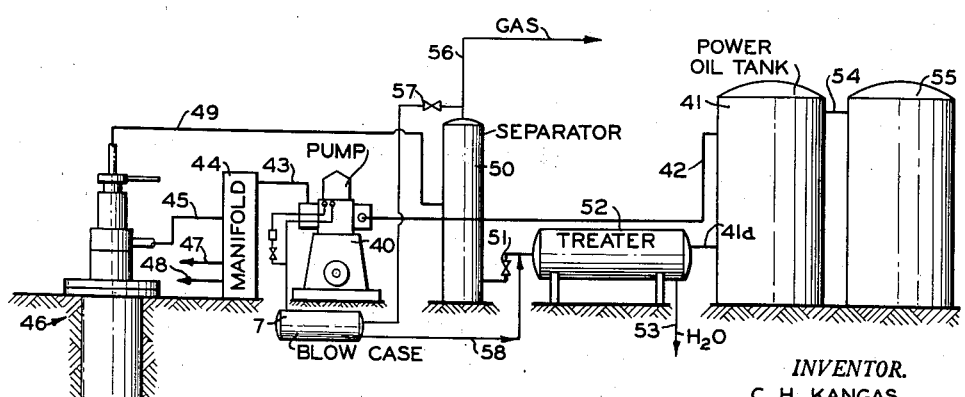
Figure 4 is a schematic view illustrating a positive displacement type pump and associated structure of this invention, as a component of equipment needed to operate a group of oil wells employing hydraulic bottom hole pumps.

With reference to Figure 4 is illustrated one manner in which my invention is advantageously utilized, in the operation of a hydraulic pump in the bottom hole of an oil producing well. Thus, pump 40, such as illustrated with reference to pump assembly P of Figure 1, pumps clean oil from power oil tank 41 through suction line 42 to discharge line 43 and manifold 44. Manifold 44 provides means for passing oil through line 45 to oil well 46 and through lines 47 and 48 to other wells not shown. The power oil which flows through pipe 45 actuates a bottom hole hydraulic pump (not shown) in a manner well known in the art and a mixed stream comprising exhaust power oil and the oil produced from the well flows from the said hydraulic pump, as discharge, by way of line 49 to liquid-gas separator 50. Liquid is discharged from separator 50 through dump valve 51 and then to treater 52, which separates oil and water, the oil flowing to power oil tank 41 by way of line 41a and the water by way of pipe 53 to disposal. The oil produced, in excess of the power oil returned by way of pump 40 to manifold 44, as described, is passed by way of conduit 54 to storage 55. Gas is removed from separator 50 by way of conduit 56. As described hereinabove with reference to Figures 1, 2 and 3, pump 40, a positive displacement type pump, can be any type desired, such as a horizontal or vertical type, it being an important feature of this embodiment that packing leaking from pump 40, such as via T 12 of Figure 1 or conduit 33 of Figure 3, or the like, be passed to blow case 7 and that, when leakage around one or more of the plungers 2 is excessive, i.e., greater than the contemplated amount, leakage is measured by way of accumulation and when it reaches a predetermined level in a conventional float switch mechanism such as element 10 of Figure 1 or element 31 of Figure 3, the flow of energy to the pump prime mover is cut off responsive to measurement of that specific level whereby to stop the pump when the said packing leakage becomes excessive.

While in the foregoing the invention has been described as it is applied to a positive displacement or plunger type pump, it will be obvious to those skilled in this art in possession of this disclosure, upon the study of it, the drawings and the appended claims to the invention, that the invention can be applied to other fluid movers or fluid treating vessels, subject to excessive leakage, in which there can be provided a collecting element or trough, as shown in the drawings, or its equivalent, and the various correlated and cooperating elements also as shown.

Reasonable variation and modification are possible within the scope of the foregoing disclosure, drawings, and the appended claims to the invention, the essence of which is that (1) excess packing leakage of a positive displacement type pump is terminated by collecting the excess leakage, and responsive to liquid level thereof, terminating flow of energy to the pump prime mover to shut down the pump; (2) apparatus is provided in combination with a positive displacement type pump comprising a receiving zone for packing leakage, conduit means for conveying leaked fluid from said receiving zone, liquid level measuring means operatively connected with said conduit means to measure liquid level therein and also operatively connected with said energy source to cut off flow of energy to the pump prime mover in response to a predetermined liquid level in said conduit means; conduit means and liquid level measuring and responsive means comprising, in one form, a single conduit connecting with the interior of said receiving zone and containing said measuring and responsive means; and in another form comprising a plurality of conduits one of which conveys normal leakage from a first level in said receiving zone, the latter zone being a trough adjacent the area of packing leakage, and the other of which conveys flow of any excess leakage from a second and higher level contains the said liquid level measuring and responsive means, and in a preferred form, includes an orifice downstream from the said liquid level measuring-responsive means; the foregoing as set forth herein.

I claim:

1. In apparatus comprising a positive displacement type pump and a prime mover therefor, wherein leakage of pumped fluid occurs around a fluid seal of said pump, the improvement comprising a receiving zone for said leakage; a first conduit extending from a first level in said receiving zone capable of conveying flow of fluid therefrom up to a maximum predetermined rate; a second conduit extending from a second level in said receiving zone higher than said first level, to convey flow of fluid therefrom; liquid level responsive means in said second conduit; an energy source for said prime mover; means for operatively connecting said liquid level responsive means with said energy source to cut off flow of energy from said source to said prime mover; said liquid level responsive means at a predetermined liquid level being adapted to control said energy source to cut off flow of energy to said prime mover and to thereby terminate operation of said pump.

2. In apparatus comprising a positive displacement type pump driven by a prime mover, wherein leakage of pumped fluid occurs around a fluid seal of said pump, the improvement comprising a receiving zone for said leakage; a conduit extending from said receiving zone for conveying flow of fluid therefrom; an orifice in said conduit adapted to permit flow of fluid from said receiving zone at a predetermined rate; liquid level responsive means in said conduit intermediate said orifice and said receiving zone; an energy source for said prime mover; means for operatively connecting said liquid level responsive means with said energy source to cut off flow of energy from said source to said prime mover; said liquid level responsive means at a predetermined liquid level being adapted to control said energy source to effect said cut off of energy to said pump and to thereby terminate operation of said pump.

3. In apparatus comprising a positive displacement type pump driven by a prime mover, wherein leakage of pumped fluid occurs around a fluid seal of said pump, and an energy source for said prime mover, the improvement comprising a receiving zone for said leakage; means adapted to permit continuous withdrawal of leaked fluid from said receiving zone at a predetermined rate; liquid level measuring means operatively connected with conduit means connected with and extending downwardly from said zone, which measuring means is adapted to measure liquid level of leaked fluid in said conduit means and is operatively connected with said energy source to cut off flow of energy from said source to said mover in response to a predetermined measured liquid level in said conduit means; thereby providing for termination of operation of said pump.

4. A method for controlling a positive displacement pump so that a normal leakage which can be tolerated does not cause shutting down of said pump but an excessive undesirably large leakage does cause the pump to shut down which comprises shutting down a positive displacement type pump, containing a fluid, when an undesirable amount of fluid leaks therefrom around a fluid seal means, comprising passing such leakage of fluid into a fluid receiving zone, withdrawing flow of leaked fluid from said zone at a maximum predetermined normal rate from a first level in said zone; accumulating any undesired excess of leakage in said zone until it rises therein to a second and higher level and then withdrawing same from said higher level as a separate column of fluid, measuring level of said separate column and in response to a predetermined measured level terminating flow of energy to the prime mover of said pump, thereby terminating the pumping operation so as to enable alteration of seal means to prevent further undesirable leakage.

5. A method for controlling a positive displacement pump so that a normal leakage which can be tolerated does not cause shutting down of said pump but an excessive undesirably large leakage does cause the pump to shut down which comprises shutting down a positive displacement type pump, containing a fluid, when an undesirable amount of fluid leaks around a fluid seal means, comprising passing such leakage of fluid into a fluid receiving zone, conducting flow of leaked fluid as a column at a normal predetermined maximum rate from said receiving zone; measuring level of said column of fluid and in response to a predetermined high level due to an undesirably high rate of leakage terminating flow of energy to the prime mover of said pump thereby terminating the pumping operation so as to enable alteration of seal means to prevent further undesirable leakage.

6. Apparatus of claim 1 wherein an orifice is disposed in said second conduit downstream from said liquid level responsive means, said orifice being adapted to permit continuous flow of fluid from said receiving zone at a predetermined rate.

7. In apparatus comprising a fluid handling means and means associated therewith to activate the same, wherein leakage of the fluid within said fluid handling means occurs, the improvement comprising a receiving zone for said leakage integrally combined with said handling means for said leakage; a first conduit extending from a first level in said receiving zone capable of conveying flow of fluid therefrom up to a maximum predetermined rate; a second conduit extending from a second level in said receiving zone higher than said first level, to convey flow of fluid therefrom; liquid level responsive means in said second conduit; an energy source for said activating means; means for operatively connecting said liquid level responsive means with said energy source to cut off flow of energy from said source to said activating means; said liquid level responsive means at a predetermined liquid level being adapted to control said energy source to cut off flow of energy to said activating means and to thereby terminate operation of said fluid handling means.

8. In apparatus comprising a fluid handling means, means for activating said handling means, wherein leakage of fluid from said handling means occurs, the improvement comprising a receiving zone for said leakage; a conduit extending from said receiving zone for conveying flow of fluid therefrom; an orifice in said conduit adapted to permit flow of fluid from said receiving zone at a maximan predetermined rate; an energy source for said activating means; liquid level responsive means in said conduit between said orifice and said receiving means; means for operatively connecting said liquid level responsive means with said energy source to cut off flow of energy to said activating means; said liquid level responsive means at a predetermined high liquid level being adapted to control said energy source to effect said cut-off of energy to said handling means and to thereby terminate operation of said handling means.

9. A method for terminating operation of a fluid handling means of fluid when excess leakage over a normal unobjectionable rate from a seal of said handling means occurs, comprising passing such leakage of fluid into a fluid receiving zone, continuously passing flow of leaked fluid from said zone at a predetermined maximum normal rate from a first level in said zone, accumulating any undesired leakage, in excess of said maximum normal rate of leakage, in said zone until it rises therein to a second level higher than said first level, passing fluid from said second level to an actuating means and terminating flow of energy to the prime mover of said fluid handling means in response to said actuating means and a predetermined amount of fluid therein, thereby preventing flow of energy to said prime mover and terminating operation of said fluid handling means.

References Cited in the file of this patent

UNITED STATES PATENTS

| | | |
|---|---|---|
| 1,683,737 | Stancliffe | Sept. 11, 1928 |
| 1,692,046 | McIlvaine | Nov. 20, 1928 |
| 1,706,704 | Phillips | Mar. 26, 1929 |
| 2,062,091 | Gouch | Nov. 24, 1936 |
| 2,288,536 | McCarty et al. | June 20, 1942 |